(12) United States Patent
Sun et al.

(10) Patent No.: US 11,981,157 B2
(45) Date of Patent: May 14, 2024

(54) OPTICAL ANTI-COUNTERFEITING ELEMENT AND OPTICAL ANTI-COUNTERFEITING PRODUCT USING THE SAME

(71) Applicants: ZHONGCHAO SPECIAL SECURITY TECHNOLOGY CO., LTD, Beijing (CN); CHINA BANKNOTE PRINTING AND MINTING CORP., Beijing (CN)

(72) Inventors: Kai Sun, Beijing (CN); Baoli Zhang, Beijing (CN); Jun Zhu, Beijing (CN); Xiaoli Wang, Beijing (CN)

(73) Assignees: ZHONGCHAO SPECIAL SECURITY TECHNOLOGY CO., LTD, Beijing (CN); CHINA BANKNOTE PRINTING AND MINTING CORP., Beijing (CN)

( * ) Notice: Subject to any disclaimer, the term of this patent is extended or adjusted under 35 U.S.C. 154(b) by 685 days.

(21) Appl. No.: 17/172,695

(22) Filed: Feb. 10, 2021

(65) Prior Publication Data
US 2021/0162793 A1 Jun. 3, 2021

Related U.S. Application Data

(62) Division of application No. 16/483,613, filed as application No. PCT/CN2018/075507 on Feb. 7, 2018, now abandoned.

(30) Foreign Application Priority Data

Feb. 20, 2017 (CN) .......................... 201710089955.2

(51) Int. Cl.
B42D 25/324 (2014.01)
B42D 25/373 (2014.01)
(Continued)

(52) U.S. Cl.
CPC ......... *B42D 25/324* (2014.10); *B42D 25/373* (2014.10); *G02B 3/005* (2013.01);
(Continued)

(58) Field of Classification Search
CPC .... B42D 25/324; B42D 25/373; B42D 25/29; B42D 25/328; B42D 25/342; G02B 3/005;
(Continued)

(56) References Cited

U.S. PATENT DOCUMENTS 6,251,566 B1   6/2001 Brosh
6,405,464 B1   6/2002 Gulick, Jr.
(Continued)

FOREIGN PATENT DOCUMENTS

CN   101767511 A   7/2010
CN     1906547 B   2/2011
(Continued)

OTHER PUBLICATIONS

Euan McLeod et al. "Unconventional methods of imaging: computational microscopy and compact implementations" published on May 23, 2016, Reports on Progress in Physics (Year: 2016).*

*Primary Examiner* — Mekonen T Bekele
(74) *Attorney, Agent, or Firm* — Volpe Koenig

(57) ABSTRACT

Disclosed are an optical anti-counterfeiting element and an optical anti-counterfeiting product utilizing the same, the optical anti-counterfeiting element comprising: a substrate (12) including a first surface and a second surface opposite to each other; micro-sampling tools (11) on the first surface; and one or more micro graphic and text units formed on the second surface, wherein the micro graphic and text unit includes micro graphic and text strokes, the micro graphic and text strokes are arranged in a non-periodic and non-fixed-geometry manner, and when the second surface is
(Continued)

observed through the micro-sampling tools, a stereoscopic animated anti-counterfeiting feature can be seen.

10 Claims, 7 Drawing Sheets

(51) Int. Cl.
| | | |
|---|---|---|
| *G02B 3/00* | (2006.01) | |
| *G02B 3/06* | (2006.01) | |
| *G02B 30/27* | (2020.01) | |
| *G06T 3/40* | (2006.01) | |
| *G06T 3/60* | (2006.01) | |
| *B42D 25/29* | (2014.01) | |
| *B42D 25/328* | (2014.01) | |

(52) U.S. Cl.
CPC ............... *G02B 3/06* (2013.01); *G02B 30/27* (2020.01); *G06T 3/40* (2013.01); *G06T 3/60* (2013.01); *B42D 25/29* (2014.10); *B42D 25/328* (2014.10)

(58) Field of Classification Search
CPC .. G02B 3/06; G02B 30/27; G06T 3/40; G06T 3/60
See application file for complete search history.

(56) References Cited

U.S. PATENT DOCUMENTS

| | | |
|---|---|---|
| 9,132,690 B2 | 9/2015 | Raymond |
| 10,569,592 B2 * | 2/2020 | Lister ..................... B42D 25/29 |
| 2008/0094713 A1 | 4/2008 | Tompkin et al. |
| 2010/0277805 A1 | 11/2010 | Schilling et al. |
| 2010/0320742 A1 | 12/2010 | Hoffmuller et al. |
| 2011/0122499 A1 | 5/2011 | Commander et al. |
| 2013/0155519 A1 | 6/2013 | Jolic |
| 2014/0191500 A1 * | 7/2014 | Holmes .................. B42D 25/21 |
| | | 283/85 |
| 2015/0298483 A1 | 10/2015 | Peng et al. |
| 2016/0167421 A1 | 6/2016 | Holmes |

FOREIGN PATENT DOCUMENTS

| | | |
|---|---|---|
| CN | 101970243 A | 2/2011 |
| CN | 102591021 A | 7/2012 |
| CN | 102975568 A | 3/2013 |
| CN | 103282212 A | 9/2013 |
| CN | 103358808 A | 10/2013 |
| CN | 101379423 B | 4/2016 |
| CN | 105555542 A | 5/2016 |
| CN | 205818771 A | 12/2016 |
| CN | 106808835 A | 6/2017 |
| WO | 2006125224 A2 | 11/2006 |
| WO | 2009017824 A2 | 2/2009 |
| WO | 2010057831 A1 | 5/2010 |
| WO | 2016149760 A1 | 9/2016 |

\* cited by examiner

OPTICAL ANTI-COUNTERFEITING ELEMENT AND OPTICAL ANTI-COUNTERFEITING PRODUCT USING THE SAME

CROSS REFERENCE TO RELATED APPLICATIONS

This application is a division of U.S. patent application Ser. No. 16/483,613, which was a 35 U.S.C. § 371 national stage of PCT/CN2018/075507, which was filed Feb. 7, 2018 and claimed priority to CN 201710089955.2, which was filed Feb. 20, 2017, all of which are incorporated by reference as if fully set forth.

FIELD

The present invention relates to the optical anti-counterfeiting field, and in particular to an optical anti-counterfeiting element and an optical anti-counterfeiting product using the same.

BACKGROUND

The microlens array security technology uses the microlens array as a sampling tool to sample the micro graphic and text array and can realize various animation effects. The Chinese patent application with the authorization number of CN1906547B discloses a technical solution based on a periodic micro graphic and text having a plane symmetry axis. The Chinese patent application with the publication No. CN101970243A discloses a design method for realizing a joint micro graphic and text of a multi-frame image. The Chinese patent application with the authorization number of CN101379423B discloses a specific manufacturing method of a micro graphic and text. The microlens array security technology has been used as a window security thread on newly issued banknotes of several countries, such as the US dollar and the English pound.

In the prior art, each micro graphic and text is identical in shape to a macro graphic and text, and there is only a difference in size between the two. In a few cases, although the micro graphic and text and macro graphic and text are different in shape, it can be found that the micro graphic and text is simply composed of fragments of the macro graphic and text. The counterfeiter can easily reproduced the micro graphic and text from the macro graphic and text or can find the design method and details of the micro graphic and text array directly using an optical microscope. On the other hand, the counterfeiter can actually use a more easily available microlens with a larger size (for example, the diameter of 50 μm or more), so that micro words can be produced by a general printing process without using the method in the Chinese patent application with the authorization number of CN101379423B. Although this method results in a thick overall thickness of the formed anti-counterfeiting element and is not suitable for batch use in banknotes, but this method can achieve substantially the same visual effect as real products. The above two deficiencies lead to the risk of counterfeiting of the microlens array anti-counterfeiting technology in the application.

SUMMARY

The object of the present invention is to provide an optical anti-counterfeiting element and an optical anti-counterfeiting product using the same to solve or at least partially solve the above technical deficiencies.

In order to achieve the above object, an embodiment of the present invention provides an optical anti-counterfeiting element including: a substrate including a first surface and a second surface opposite to each other; and micro-sampling tools formed on the first surface; and one or more micro graphic and text units formed on the second surface, wherein the micro graphic and text unit includes micro graphic and text strokes arranged in a non-periodic and non-fixed-geometry manner, and when the second surface is observed through the micro-sampling tools, a stereoscopic animated anti-counterfeiting feature can be seen.

Another embodiment of the present invention provides an optical security product using the above optical anti-counterfeiting element.

According to the above technical solution, the micro graphic and text strokes of the micro graphic and text unit are arranged on the micro graphic and text unit in a non-periodic and non-fixed-geometry manner, thereby making it difficult for the counterfeiter to reproduce the micro graphic and text from the macro graphic and text or implement imitation design and counterfeiting through the optical microscope; and the arrangement of the micro graphic and text strokes enables to form a stereoscopic animated anti-counterfeiting feature when the second surface of the anti-counterfeiting element is observed through the micro-sampling tools, further the anti-counterfeiting performance of the anti-counterfeiting element is improved.

Other features and advantages of the invention will be described in detail in the detailed description of the following embodiments.

BRIEF DESCRIPTION OF THE DRAWINGS

The drawings are included to provide a further understanding of the invention and form part of the specification. The drawings are used to explain the invention together with the detailed description below but are not intended to limit the invention. In the drawings:

FIG. 3b is a cross-sectional schematic diagram of an area between a micro graphic and text stroke and a micro graphic and text stroke in the optical anti-counterfeiting element shown in FIG. 3a;

FIG. 6 is high security printing using the optical anti-counterfeiting element according to the present invention in the form of a window security thread, a window film, labeling or the like.

DETAILED DESCRIPTION

Hereinafter, an optical anti-counterfeiting element and an optical anti-counterfeiting product using the same of the present invention will be described in detail with reference to the accompanying drawings. It should be understood that the drawings and detailed description are merely illustrative of the preferred embodiments of the invention and are not intended to limit the protection scope of the invention. Moreover, those skilled in the art will appreciate that the gray scales and dimension scales in all the Figures are merely illustrative and do not represent actual colors and dimension scales.

Figure 1:
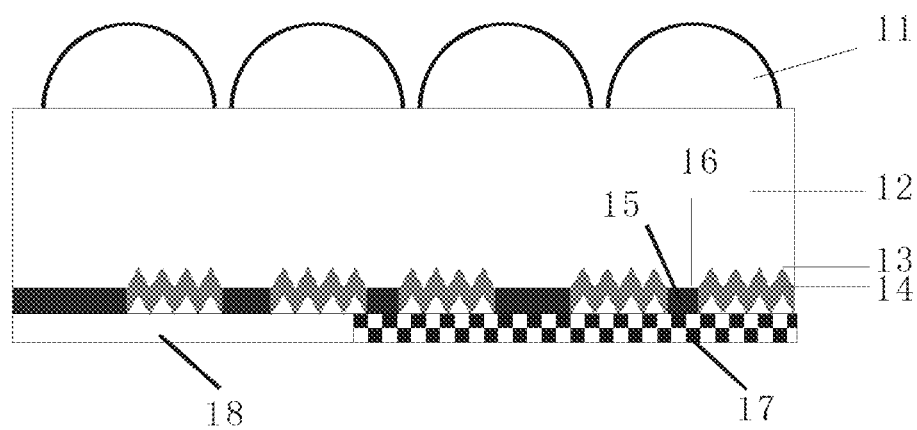
FIG. 1 is a cross-sectional view of an optical anti-counterfeiting element according to an embodiment of the present invention.

As shown in FIG. 1, an optical anti-counterfeiting element 1 according to an embodiment of the present invention may comprise: a substrate 12 including a first surface and a second surface opposite to each other; micro-sampling tools 11 formed on the first surface of the substrate 12; and one or more micro graphic and text units formed on the second surface of the substrate 12. The micro graphic and text strokes in each micro graphic and text unit are arranged in a non-periodic and non-fixed-geometry manner, thus making it difficult for a counterfeiter to reproduce the micro graphic and text from the macro graphic and text or perform imitation design and counterfeiting by an optical microscope. The arrangement of the micro graphic and text strokes enables to form a stereoscopic animated anti-counterfeiting feature when the second surface of the anti-counterfeiting element is observed through the micro-sampling tools, which further improves the anti-counterfeiting performance of the anti-counterfeiting element.

The micro graphic and text units may be formed on the second surface of the substrate 12 at intervals in a periodic or non-periodic manner. It can be understood that a part of the second surface of the substrate 12 is micro graphic and text strokes, and the other part is areas among the micro graphic and text strokes. Optionally, the micro graphic and text strokes may be conformally covered with a first coating, and/or the areas among the micro graphic and text strokes may be covered with a second coating, the areas among the micro graphic and text strokes has a clear visual contrast through the conformal covering of the first coating and/or the second coating, so that a colored and stereoscopic animated anti-counterfeiting feature can be formed when the second surface of the anti-counterfeiting element is observed through the micro-sampling tools, and greater public appeal and greater resistance to counterfeiting are achieved.

In the anti-counterfeiting element shown in FIG. 1, a part of the second surface of the substrate 12 is micro graphic and text strokes formed by the micro-relief structure 13, and the other part is areas among the micro graphic and text strokes, which is a flat area 16. The micro-relief structure 13 is conformally covered with a coating 14 and the flat area 16 is conformally covered with a coating 15. The coating 14 and the coating 15 enable a clear visual contrast between the flat area 16 and the micro-relief structure 13. By observing the second surface of the anti-counterfeiting element through the micro-sampling tools 11, a colored animated anti-counterfeiting feature can be seen.

In a preferred embodiment of the present invention, the substrate 12 may be a colored or colorless film that is transparent to visible light. For example, the substrate 12 may be a film composed of one of the following materials: polyglycol terephthalate, polyvinyl chloride, polyethylene, polycarbonate, polypropylene, metal, glass, paper, and the like. The thickness of the substrate 12 preferably matches the focal length of the micro-sampling tools 11.

In a preferred embodiment according to the present invention, the micro-sampling tools 11 may be a microlens array, such as any one or any combination of the following: a cylindrical lens array, a spherical lens array, a Fresnel lens array, or the like. Of course, the micro-sampling tools 11 can also be other types of microlens arrays as long as they can realize sampled imaging on the micro graphic and texts.

In a preferred embodiment according to the present invention, the micro-relief structure 13 may include any one or any combination of the following: a diffraction grating having a period from 0.8 μm to 3 μm, a blazed grating having a period from 3 μm to 30 μm, a random scattering structure, and a sub-wavelength grating having a period from 0.1 μm to 0.8 μm.

In a preferred embodiment according to the invention, the coating 14 and the coating 15 have the same number of layers and materials, but the thickness of each layer may be different. The coating 14 and the coating 15 may be a single layer or a plurality of layers, and the total thickness may range from 10 nm to 1000 nm. The coating 14 conformally covers the micro-relief structure 13, i.e., the upper and lower surfaces of the coating 14 have the same surface relief as the micro-relief structure 13, and the conformal coverage is indispensable for achieving a clear visual contrast between the flat area 16 and the micro-relief structure 13.

The coating layer 14 and the coating layer 15 may each comprise any one or any combination of the following coatings: a single layer metal coating; a multilayer metal coating; a coating formed by an absorbing layer, a low refractive index medium layer and a reflective layer, wherein the absorbing layer is in contact with the micro-relief structures or the areas among the micro graphic and text strokes; a high refractive index medium coating; a multi-medium-layer coating formed by sequentially stacking a first high refractive index medium layer, a low refractive index medium layer, and a second high refraction layer; and a coating formed by sequentially stacking an absorbing layer, a high refractive index medium layer, and a reflective layer, wherein the absorbing layer is in contact with the micro-relief structures or the areas among the micro graphic and text strokes. In an embodiment of the invention, a high refractive index refers to a refractive index greater than or equal to 1.7, and a low refractive index refers to a refractive index less than 1.7. The material of the metal coating may be metal such as gold, silver, copper, aluminum, iron, tin, zinc, nickel, chromium or an alloy thereof; and the high refractive index medium material may be ZnS, TiN, $TiO_2$, TiO, $Ti_2O_3$, $Ti_3O_5$, $Ta_2O_5$, $Nb_2O_5$, $CeO_2$, $Bi_2O_3$, $Cr_2O_3$, $Fe_2O_3$, $HfO_2$, ZnO, etc., the low refractive index medium material may be $MgF_2$, $SiO_2$, etc.; the absorption layer material may be metal such as chromium, nickel, copper, cobalt, titanium, vanadium, tungsten, tin, silicon, germanium, or a mixture or alloy thereof; the material of the reflective layer may be metal such as gold, silver, copper, aluminum, or a mixture or alloy thereof.

In a preferred embodiment according to the present invention, the coating 14 and the coating 15 produce a distinct color by physical principles such as diffraction, interference, metal intrinsic absorption, plasma resonance absorption, or the combination of the coating 14 and the micro-relief structure 13 produces a distinct color through physical principles such as diffraction, interference, metal intrinsic absorption, and plasma resonance absorption. When the viewing angle is changed, the color changes significantly, preferably the hue angle changes by more than 90°.

In a preferred embodiment according to the invention, the surface of the coating 14 and/or the coating 15 may be at least partially covered with the color layer 17, the area 18 not covered with the color layer is an area without the color layer, the color of the color layer 17 can be one color or a combination of colors. The coating 14 or 15 can be designed to be substantially transparent to at least a portion of the visible light band such that the effect of the color layer 17 can be observed. Preferably, the color layer 17 can be a white cover layer to enhance the visual contrast.

In the micro graphic and text unit, the arrangement of the micro graphic and text strokes is non-periodic, and the micro graphic and text has no fixed shape. The specific arrangement form of the micro graphic and text is determined by the arrangement form of the micro-sampling tools 11 and the macroscopic animation effect to be achieved. In a preferred embodiment in accordance with the invention, the micro-sampling tools 11 employ a periodic array of microlenses, the achieved animation feature is size scaling of a fixed geometry, i.e., only size changes when the viewing angle changes, without the change in shape. The micro graphic and text corresponding to the micro-sampling tool arrangement and the animation feature is non-periodic and has no fixed shape.

In a preferred embodiment in accordance with the invention, the micro graphic and text strokes in the micro graphic and text unit can be designed to be arranged only in the first direction and not in the second direction perpendicular thereto. Compared to the micro graphic and text units arranged in both directions, the advantage of this arrangement is that the second surface of the substrate 12 is prevented from being divided into finely divided areas, a relatively complete continuous area facilitates formation of the micro graphic and textic strokes with the micro-relief structure 13. A second advantage is that the one-dimensional micro-sampling tools, such as micro-cylindrical lenses, that correspond to the unidirectional arrangement can be used, which produces significant refraction only for incident light in one direction, and facilitates preserving of color variation features and colors of the coating 14 and the coating 15.

In order to ensure the application on the banknote, the total thickness of the optical anti-counterfeiting element provided by the present invention is preferably not more than 50 μm.

Figure 2:
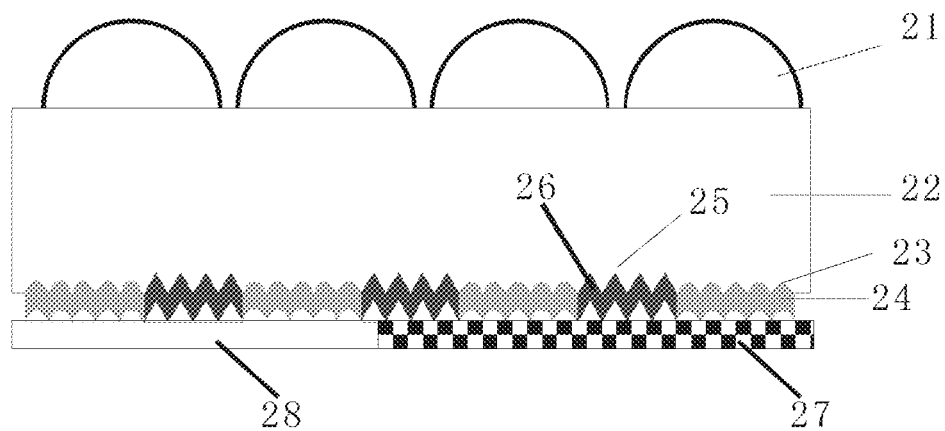
FIG. 2 is a cross-sectional view of an optical anti-counterfeiting element according to an embodiment of the present invention.

As shown in FIG. 2, an optical anti-counterfeiting element 2 according to an embodiment of the present invention may compromise a substrate 22 including a first surface and a second surface opposite to each other, wherein the first surface is covered with micro-sampling tools 21, the second surface is formed with one or more micro graphic and text units, and the micro graphic and text strokes in each micro graphic and text unit are arranged in a non-periodic and non-fixed-geometry manner, a stereoscopic animated security feature can be formed when the second surface is observed through the micro-sampling tools. In the anti-counterfeiting element shown in FIG. 2, the micro graphic and text strokes are formed by a micro-relief structure 23, and the area among the micro graphic and text strokes is formed by a micro-relief structure 25. The micro-relief structure 23 is conformally covered with a coating 24, and the micro-relief structure 25 is conformally covered with a coating 26, so that there is a significant visual contrast between the micro-relief structure 23 and the micro-relief structure 25. When the second surface is observed through the micro-sampling tools 21, a colored and stereoscopic animated security feature can be seen.

Further, the surface of the coating 24 and/or the coating 26 may be at least partially covered with the color layer 27, the area 28 not covered with the color layer is an area without the color layer, the color of the color layer 27 can be one color or a combination of colors. The coating 24 or 26 can be designed to be substantially transparent to at least a portion of the visible light band such that the effect of the color layer 27 can be observed. Preferably, the color layer 27 can be a white cover layer to enhance the visual contrast. In order to ensure the application on the banknote, the total thickness of the optical anti-counterfeiting element is preferably not more than 50 μm.

The difference of the optical anti-counterfeiting element shown in FIG. 2 and the optical anti-counterfeiting element shown in FIG. 1 lies in that the area among the micro graphic and text strokes are formed by a micro-relief structure 25, which may have a different period and a different depth compared with the micro-relief structure 23. In a preferred embodiment of the present invention, the micro-relief structure 25 is a random scattering structure that, in combination with the coating 26, produces a matte effect, thus facilitating public viewing in a variety of lighting environments compared with a flat mirror. The period of the random scattering structure ranges from 0.5 μm to 5 μm, the depth may selectively range from 0.05 μm to 0.3 μm, and the period and depth vary randomly within the above ranges. The random scattering structure may also be a non-diffractive micro-mirror having a period ranging from 5 μm to 20 μm, a depth ranging from 0.5 μm to 3 μm, and an azimuthal angle ranging from 0° to 360°, with the period, depth and azimuth being randomly selected within the above ranges, a matte effect is formed in various lighting environments.

Figure 3A:
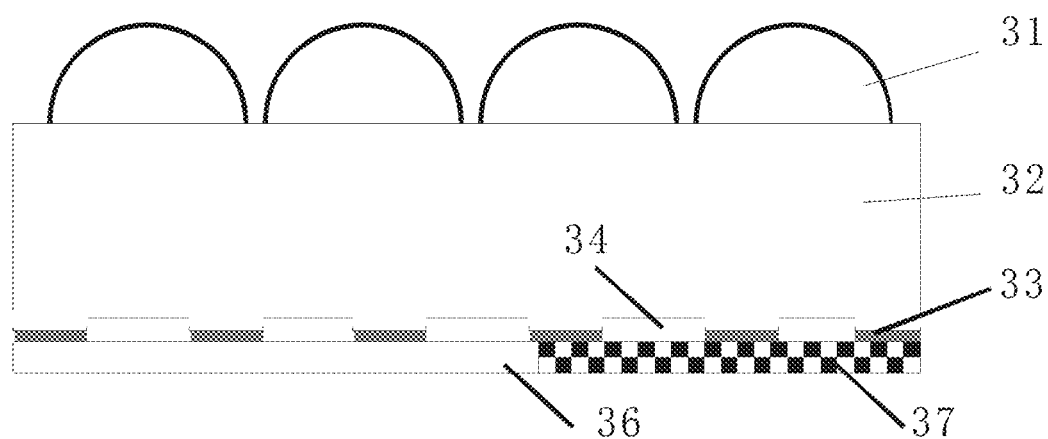
FIG. 3a is a cross-sectional view of an optical anti-counterfeiting element according to an embodiment of the present invention.

As shown in FIG. 3a, an optical anti-counterfeiting element 3 according to an embodiment of the present invention may comprises a substrate 32 including a first surface and a second surface opposite to each other, wherein the first surface is covered with micro-sampling tools 31, one or more micro graphic and text units are formed on the second surface, and the micro graphic and text strokes 33 in each micro graphic and text unit are arranged in a non-periodic and non-fixed-geometry manner, and a stereoscopic animated security feature can be formed when the second surface is observed by the micro-sampling tools. In the anti-counterfeiting element shown in FIG. 3a, the micro graphic and text strokes 33 are coated micro graphic and text strokes 33, and the areas 34 among the micro graphic and text strokes 33 are uncoated, that is, light-transmitting, the coated micro graphic and text strokes 33 are convex compared to the uncoated areas 34 among the micro graphic and text strokes 33. There is a significant visual contrast between the coated micro graphic and text strokes 33 and the uncoated areas 34 among the micro graphic and text strokes 33. When the second surface is observed through the micro-sampling tools 21, a colored and stereoscopic animated security feature can be seen.

Further, the surface of the coated micro graphic and texts 33 and the uncoated areas 34 among the micro graphic and texts 33 may be at least partially covered with a color layer 37, and the area 38 not covered with the color layer is an area without the color layer, the color of the color layer 37 may be one color or a combination of colors, and the color layer 37 may be observed through the area 34. In order to ensure the application on the banknote, the total thickness of the optical anti-counterfeiting element is preferably not more than 50 μm.

The difference between the optical anti-counterfeiting element shown in FIG. 3a and the optical anti-counterfeiting element shown in FIG. 1 or FIG. 2 lies in that the area 34 among the micro graphic and textic strokes 33 are light transmissive. In a preferred embodiment of the present invention, the light transmissive area 34 may adopt a large depth-to-width ratio microstructure, which may have a period from 0.2 μm to 2 μm, and a depth ranging from 0.3 μm to 1 μm, and the depth-to-width ratio range can be from 0.3 to 1. The area of the micro graphic and text strokes 33 is flat or formed by a microstructure having a depth-to-width ratio ranging from 0 to 0.3. In forming the coating of the micro graphic and text strokes, first, the coating integrally covers the second surface of the optical anti-counterfeiting element 3, and the influence of the depth-to-width ratio on the thickness of the coating is well known to those skilled in the art (for example, as disclosed in the patent US 2008/0094713A1), after the optical anti-counterfeiting element 3 passes through a corrosive liquid, such as a NaOH solution, the coating of the high depth-to-width ratio area is preferentially removed, while the coating of the low depth-to-width ratio area is substantially retained, thereby providing a significant visual contrast between the coated micro graphic and text strokes 33 and the uncoated area 34 among the micro graphic and text strokes 33.

Figure 3B:
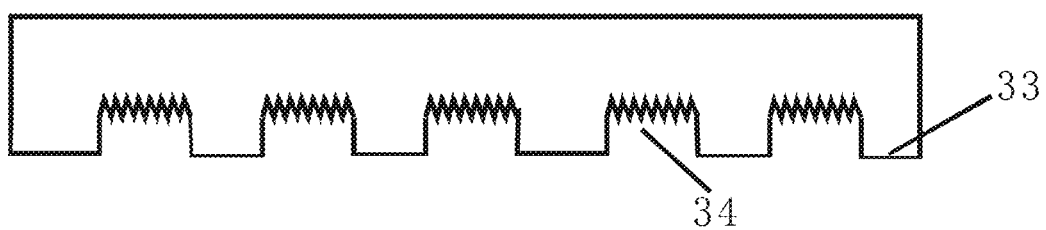

In the present embodiment, as shown in FIG. 3b, the micro graphic and text strokes 33 are convex compared to the area 34 among the micro graphic and text strokes 33. When the coating covers the second surface of the optical anti-counterfeiting element 3, the occlusion of the convex portion will reduce the coating coverage thickness of the area 34, thereby facilitating subsequent removal of the coating from this area.

Figure 4A:
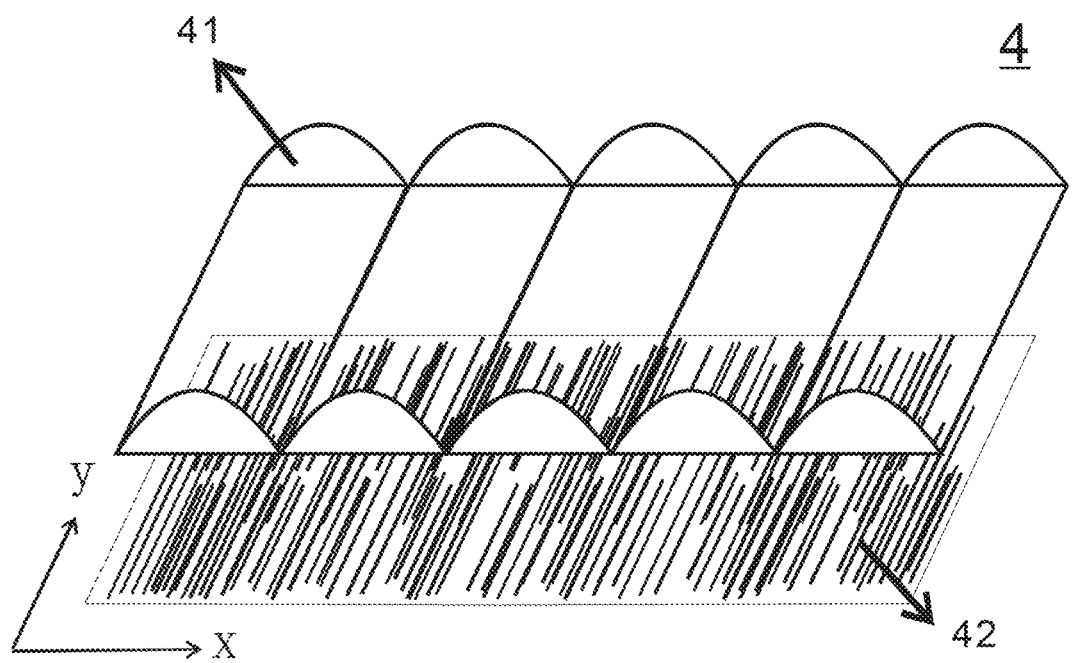
FIG. 4a is a top view of an optical anti-counterfeiting element in an embodiment of the present invention.

FIG. 4a is a top view of an optical anti-counterfeiting element in an embodiment of the present invention. As shown in FIG. 4a, an optical anti-counterfeiting element 4 according to an embodiment of the present invention includes the micro-cylindrical lens array 41 periodically arranged only in the x direction, and the axial direction of the micro-cylindrical lens in the micro-cylindrical lens array is perpendicular to the x-direction, the micro-cylindrical lens array 41 simply extends in the y-direction perpendicular to the x-direction, and the extension length is determined by the size of a macroscopic enlarged image designed and is preferably in the range of 1-10 mm. The corresponding micro graphic and text array 42 composed of the micro graphic and text strokes is arranged in the x-direction and is not arranged in the y-direction perpendicular to the x-direction. The micro-cylindrical lens array 41 is not sampled and amplified in the y-direction, and thus the micro graphic and text array 42 appears to be "stretched" into elongated lines in the y-direction, and the length in the y-direction preferably ranges from 1 to 10 mm.

Figure 4B:
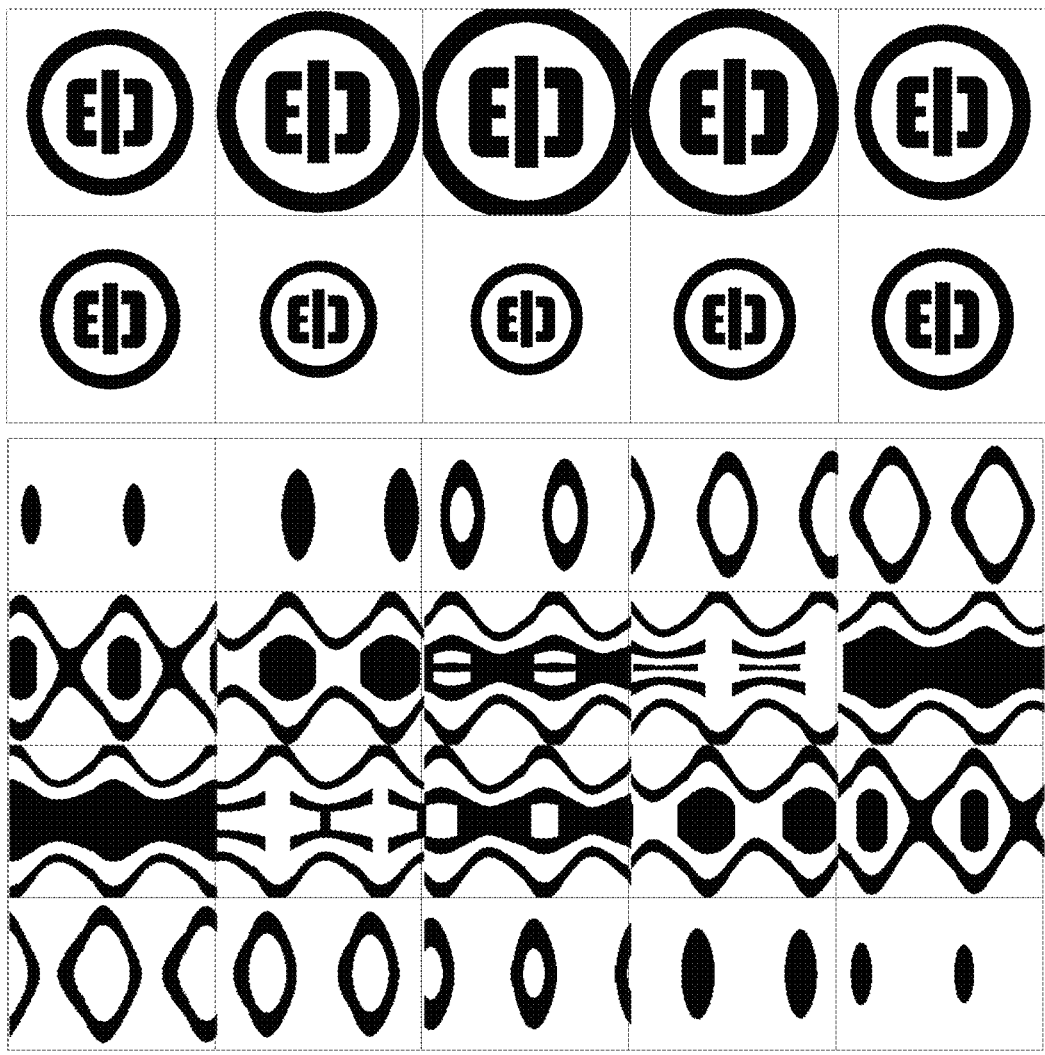
FIG. 4b is a macroscopic reproduction diagram and a micro graphic and textic design diagram in an embodiment of the present invention.
Figure 4C:
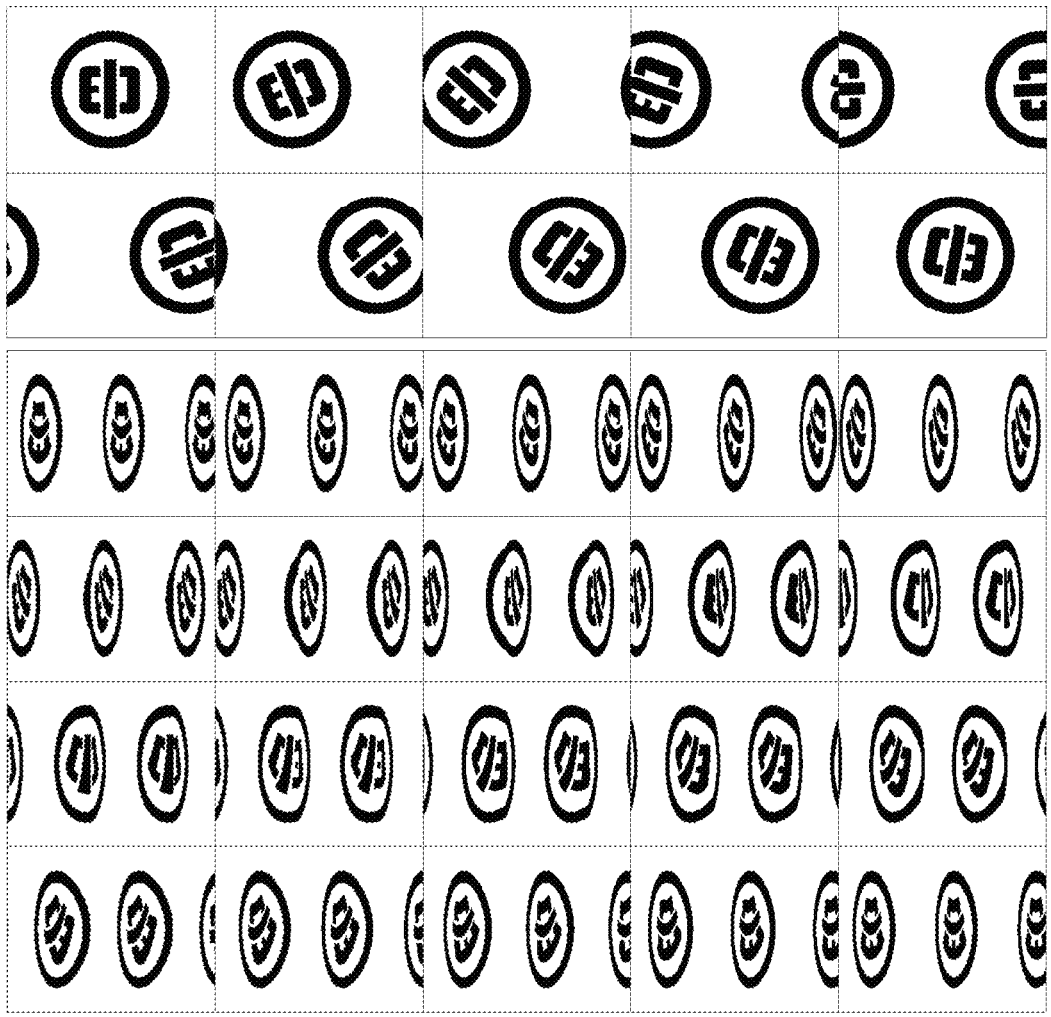
FIG. 4c is a macroscopic reproduction diagram and a micro graphic and textic design diagram according to an embodiment of the present invention.
Figure 4D:
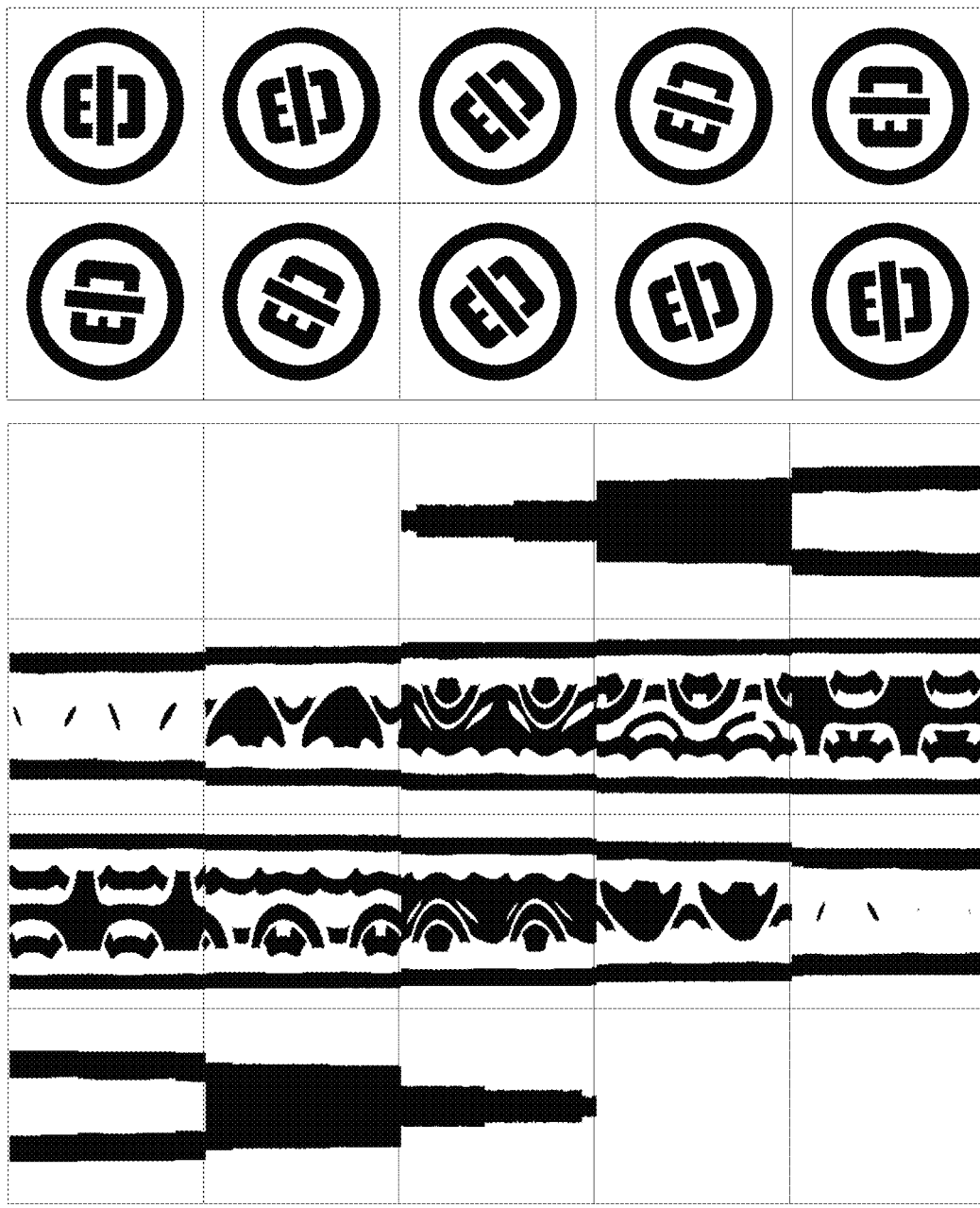
FIG. 4d is a macroscopic reproduction diagram and a design diagram of micro graphic and text according to an embodiment of the present invention.

FIGS. 4b-4d are three different animation effects (top) and taken partial views of the corresponding micro graphic and text array 42 (bottom).

In the top part of FIG. 4b from top left to bottom right, there are 10 images showing 10 frames taken from the "zooming" animation of a circular icon. The specific feature is that when the viewing angle changes continuously from −30° to 30°, the icon is continuously enlarged from 1 time (original size) to 1.33 times, then is continuously reduced to 0.7 times, and finally is enlarged to 1 time. The bottom part of FIG. 4b shows the micro graphic and text array 42 corresponding to the animation effect. In the bottom part of FIG. 4b from top left to bottom right, there are 20 images showing equidistantly intercepted partial images of the micro graphic and text array 42. To clearly illustrate the arrangement manner of the micro graphic and text array 42, the 20 partial images of the bottom part of FIG. 4b are compressed 100-200 times in the y direction. The micro graphic and text strokes shown in the bottom part of FIG. 4b have no fixed shape, and there is no uniform arrangement pitch or period In the top part of FIG. 4c from top left to bottom right, there are 10 images showing 10 frames taken from the right-to-left "scrolling" animation of a circular icon. The specific feature is that when the viewing angle changes continuously from −30° to 30°, the circular icon rotates 180° at a constant speed while naturally does translational motion from right to left. When an icon reaches the left boundary of the designed macroscopic image, it periodically scrolls from the right border into the magnified graph, i.e. the animation is continuous at the boundary. The bottom part of the FIG. 4c from the top left to the bottom right is 20 images showing equidistantly intercepted partial images of the micro graphic and text array 42. To clearly illustrate the arrangement manner of the micro graphic and text array 42, the 20 partial images of the bottom part of FIG. 4c are compressed 100-200 times in the y direction. The micro graphic and text strokes shown in the bottom part of FIG. 4c have no fixed shape, and there is no uniform arrangement pitch or period.

In the top part of FIG. 4d from top left to bottom right, there are 10 frames taken from the in-situ rotation animation of a circular icon. The specific feature is that when the viewing angle changes continuously from −30° to 30°, the circular icon rotates counterclockwise 90° at a constant speed, then rotates 90° clockwise to return to the original position, and the center position is kept unchanged during the rotation. In the bottom part of FIG. 4d from top left to bottom right, there are 20 images showing equidistantly intercepted partial images of the micro graphic and text array 42. To clearly illustrate the arrangement manner of the micro graphic and text array 42, the 20 partial images of the bottom part of FIG. 4d are compressed 100-200 times in the y direction. The micro graphic and text strokes shown in the bottom part of FIG. 4d have no fixed shape, and there is no uniform arrangement pitch or period.

In order to generate any animation effect, a general micro graphic and text array design method is required, which includes the following three steps 1) The macroscopic magnified image $F(\theta i, \varphi j)$ seen at each observation angle is determined, $\theta$ and $\varphi$ are the inclination angle of the sample rotating in the y-axis and the inclination angle rotating in the x-axis respectively, i and j are respectively the serial numbers of the animation frames when the sample rotates in the y-axis and in the x-axis, and the range of i and j is 1, 2, 3 . . . M. That is, M frames are taken in the x and y directions, and the total number of frames is M*M frames.

2) Each macroscopic magnified image $F(\theta i, \varphi j)$ is pixelated according to the actual size of the macro image and the size of the micro-sampling tool, and each pixel corresponds to one micro-sampling tool; for example, the macro image is square, the side length is L, and the pitch of the micro-sampling tool is p, then the number of micro-sampling tools included in the length of L is N=L/p. One micro-sampling tool corresponding to one pixel can be realized by scaling the macroscopic magnified image $F(\theta i, \varphi j)$ to N*N pixels.

Figure 5:
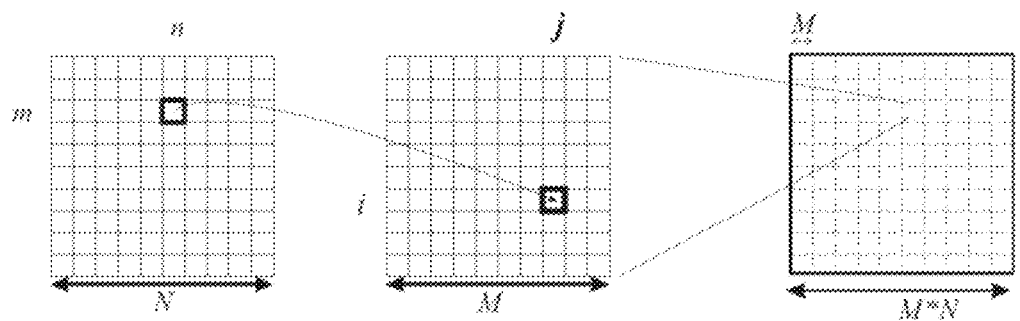
FIG. 5 is a schematic diagram showing a design method of a micro graphic and text array corresponding to a general animation feature.

3) Each pixel is projected to the micro graphic and text area corresponding to the micro-sampling tool according to the viewing angle. The design of the micro graphic and text array is completed after traversing all the macro images and all the micro-sampling tools. As shown in FIG. 5, the macro image $F(\theta i, \varphi j)$ is composed of N*N pixels, and each pixel corresponds to the contribution of one micro-sampling tool. The pixel (m, n) of the mth row and the nth column will correspond to a certain position under the micro-sampling tool of the mth row and the nth column, and the position is determined by the frame serial numbers i and j of the observation angles $\theta$ and $\varphi$ of the macroscopic image $F(\theta i, \varphi j)$ considered. The value of the pixel (m, n) can be assigned to the pixel (i, j) of the micro graphic and text array 42 by the observation angles $(\theta i, \varphi j)$ corresponding to the $F(\theta i, \varphi j)$. By traversing the M*M macroscopic magnified images at the angles $\theta$ and $\varphi$ and the N*N micro-sampling tools involved, total micro graphic and text information containing $(M*N)^2$ micropixels can be generated.

The micro graphic and text arrays used by but not limited to the three animation effects of FIGS. 4b-4d can be derived from the above design methods. In general, the animated features of a non-simple translational motion correspond to non-periodic, non-fixed-shape micro graphic and text arrays. The simple translational motion described in the present invention refers to a one-direction translational motion of a straight line along any direction in the case where the design image maintains the shape and appearance unchanged.

Figure 6:
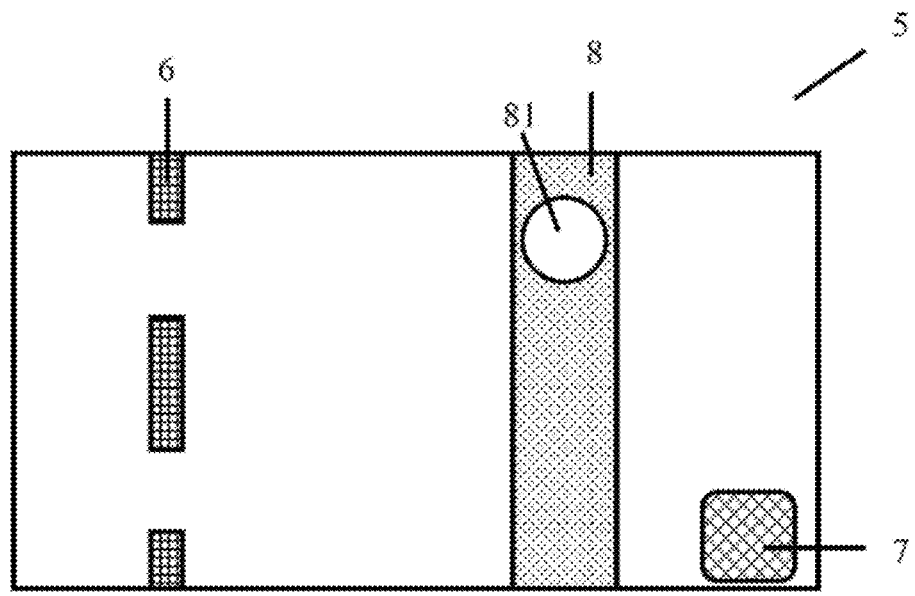

The optical anti-counterfeiting element according to the present invention can be applied to products with high added value such as banknotes, identity documents, and securities, and can be used by means of window security thread, window strip, labeling, etc. on these high value-added products. FIG. 6 is a schematic diagram of the use of an optical anti-counterfeiting element in the present invention on a high security print 5 in different manners. The optical anti-counterfeiting element can form a window security thread 6 by the prior art in the anti-counterfeiting paper manufacturing process, the window security thread 6 can be segmentally embedded in the print 5, and the rest is located on the surface of the print 5; the optical security component according to the present invention is also possible to be adhered to the surface of the print 5 in the manner of labeling 7; the optical anti-counterfeiting element according to the present invention can also be adhered to the surface of the print 5 in the manner of a wide strip 8, and in the region where the wide strip 8 is located there is a window 81 (view-finder) having an arbitrary shape and size. The window 81 is obtained by partially removing the print 5, and the transmissive security feature of the wide strip 8 is observed through the window 81. The print 5 may use any one of the window security thread 6, the labeling 7, and the wide strip 8, or a combination thereof.

Another aspect of the present invention provides a product with the optical anti-counterfeiting element, including but not limited to various types of high security products and high value-added products such as banknotes, credit cards, passports, and securities, and various types of wrapping paper, packing boxes, etc.

In the solutions provided by the above embodiments of the present application, the micro graphic and texts strokes of the micro graphic and text unit are arranged on the micro graphic and text unit in a non-periodic and non-fixed-geometry manner, thereby making it difficult for the counterfeiter to perform imitation design and counterfeiting based on a reproduced macrograph of the anti-counterfeiting element or by an optical microscope. The arrangement of the micro graphic and text strokes enables to form a stereoscopic animated anti-counterfeiting feature when the second surface of the anti-counterfeiting element is observed through the micro-sampling tool, thus further improving the anti-counterfeiting performance of the anti-counterfeiting element. In addition, the optical anti-counterfeiting element and the security product according to the present invention can be mass-produced by using a general-purpose device in the field, and the process is highly feasible.

The preferred embodiments of the present invention have been described in detail above with reference to the accompanying drawings. However, the present invention is not limited to the specific details of the embodiments described above, and various modifications may be made to the technical solutions of the present invention within the scope of the technical idea of the present invention. These simple variations are within the scope of the invention It should be further noted that the specific technical features described in the above specific embodiments may be combined in any suitable manner without contradiction. To avoid unnecessary repetition, the present invention will not further describe various possible combinations.

In addition, any combination of various embodiments of the invention may be made as long as it does not deviate from the idea of the invention, and should be regarded as the disclosure of the invention.

What is claimed is:

1. A design method for micro image-text units of an optical anti-counterfeiting element, the method comprising:
    determining actual images, wherein each image $F(\theta i, \varphi j)$ of the actual images having an actual size and corresponding a macroscopic magnified image of the optical anti-counterfeiting element, wherein $\theta$ and $\varphi$ are an inclination angle of the macroscopic magnified image rotating in a y-axis and an inclination angle rotating in an x-axis, respectively, i and j are respective serial numbers of animation frames when the macroscopic magnified image rotates in the y-axis and in the x-axis;
    pixelating the each image $F(\theta i, \varphi j)$ according to the actual size of the each image $F(\theta i, \varphi j)$ and a size of a micro-sampling tool formed on a first surface of a substrate of the optical anti-counterfeiting element, and each pixel of the each image $F(\theta i, \varphi j)$ corresponding to one micro-sampling tool, wherein the each image $F(\theta i, \varphi j)$ is scaled and pixelated into N*N pixels, wherein N=L/p, p is a pitch of the micro-sampling tool, L is a side length of the macroscopic magnified image;
    projecting each pixel to a micro image-text unit corresponding to the micro-sampling tool according to the inclination angles $\theta$ and $\varphi$, such that each micro image-text unit is composed of one pixel from the each image $F(\theta i, \varphi j)$,
    when a second surface of the substrate of the optical anti-counterfeiting element is observed through the micro-sampling tools, a stereoscopic animated anti-counterfeiting feature of the macro magnified image can be seen.

2. The design method according to claim 1, wherein the micro image-text unit includes micro image-text strokes arranged in a non-periodic and non-fixed-geometry manner, and the optical anti-counterfeiting element further comprises:
    micro image-text units formed on the second surface;
    a first coating that is conformally covered on the micro image-text strokes; and/or
    a second coating that is conformally covered on areas among the micro image-text strokes of the second surface.

3. The design method according to claim 1, wherein the micro-sampling tool includes a microlens array.

4. The design method according to claim 3, wherein the microlens array is any one or any combination of: a cylindrical lens array, a spherical lens array, or a Fresnel lens array.

5. The design method according to claim 2, wherein the first coating and/or the second coating is any one or any combination of: a single layer metal coating; a multilayer metal coating; a coating formed by an absorbing layer, a low refractive index medium layer and a reflective layer; a high refractive index medium coating; a multi-medium-layer coating formed by sequentially stacking a first high refractive index medium layer, a low refractive index medium layer, and a second high refraction layer; and a coating formed by sequentially stacking an absorbing layer, a high refractive index medium layer, or a reflective layer.

6. The design method according to claim 2, wherein the optical anti-counterfeiting element further comprises a color layer at least partially covered on the surface of the first coating and/or the second coating.

7. The design method according to claim 6, wherein the color layer has one color or a combination of a plurality of colors.

8. The design method according to claim 1, wherein the sampling tool includes a micro-cylindrical lens array.

9. The design method according to claim 8, wherein an axial directions of micro-cylindrical lenses in the micro-cylindrical lens array are perpendicular to the first direction.

10. The design method according to claim 1, wherein the substrate is a colored or colorless film that is transparent to visible light and is composed of one of:

polyglycol terephthalate, polyvinyl chloride, polyethylene, polycarbonate, polypropylene, metal, glass, or paper.

* * * * *